J. H. THOMAS.
Gridiron.
No. 21,157.
Patented Aug. 10, 1858.
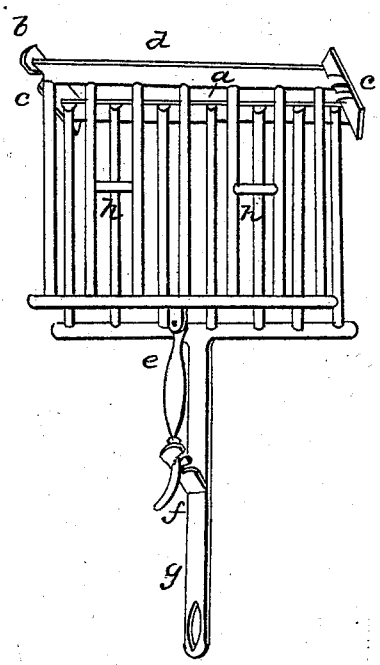

UNITED STATES PATENT OFFICE.

J. H. THOMAS, OF NEWARK, NEW JERSEY.

FOLDING GRIDIRON.

Specification of Letters Patent No. 21,157, dated August 10, 1858.

*To all whom it may concern:*

Be it known that I, JOSEPH H. THOMAS, of the city of Newark, county of Essex, and State of New Jersey, have invented an Improved Adjustable Folding Gridiron; and I do hereby declare that the following is a full, clear, and exact description of the same, reference being had to the accompanying drawing, making part of this specification.

To the back cross bar $a$ of the gridiron constructed in the ordinary manner, the two standards, $b$, $b$, are attached having the slots in them as represented by $c$, $c$. A similar set of bars is constructed, the back cross bar of which, $d$, has projecting bearings on its ends which are fitted to the slots $c$, $c$, and form a movable joint or hinge, on which the two sets of bars are moved to or from each other.

To the front cross bar of the upper set is attached the jointed handle, $e$, which works in the slotted standard, $f$, attached to the main handle, $g$, and holds the two sets of bars in the relative position required and forming a double or folding gridiron. In the upper set of bars are the two points $h$, $h$, for the purpose of securing in its place the article to be cooked.

In operating this gridiron, the meat is placed on the lower set of bars, and the upper set is adjusted in the slots $c$, $c$ according to the thickness of the meat; and the jointed handle, $e$, locked in its appropriate slot in the standard $f$, securing the meat firmly in its place. When one side is cooked it is only necessary to turn the gridiron over (the points $h$, $h$, preventing any slipping out of the meat in so doing) to cook the other side, instead of turning the meat itself in the inconvenient method as now practiced thus saving time and trouble. For broiling fish it obviates the danger of tearing it to pieces which is so frequent in the ordinary method.

I do not claim the invention of double or folding gridirons, but

What I claim as my invention and desire to secure by Letters Patent is—

The application to a folding gridiron of the hinge joint formed by the slotted standards $b$, $b$, and the projecting bearings on the ends of the back cross bar $d$, or their equivalents; the jointed handle $e$, and slotted standard $f$, or their equivalents, the whole forming an adjustable folding gridiron, substantially as described.

J. H. THOMAS.

Witnesses:
FERDINAND J. HERPERS,
C. T. DAY.